United States Patent [19]
Faroudja et al.

[11] 3,820,154
[45] June 25, 1974

[54] PHASED COLOR UNDER VIDEO RECORDING AND PLAYBACK METHOD AND APPARATUS

[75] Inventors: Yves Charles Faroudja, Los Altos Hills; Leonard Kowal, Saratoga, both of Calif.

[73] Assignee: International Video Corporation, Sunnyvale, Calif.

[22] Filed: Aug. 25, 1972

[21] Appl. No.: 283,700

[52] U.S. Cl. .......... 358/8
[51] Int. Cl. .......... H04n 5/78
[58] Field of Search .......... 178/5.4 P, 5.4 CD, 5.5 Y, 178/6.6 TC

[56] References Cited

UNITED STATES PATENTS

| | | | |
|---|---|---|---|
| 3,619,491 | 11/1971 | Fujita | 178/5.4 CD |
| 3,626,087 | 12/1971 | Tomioka | 178/5.4 CD |
| 3,660,596 | 5/1972 | Numakura | 178/5.4 CD |
| 3,704,341 | 11/1972 | Fujita | 178/5.4 CD |
| 3,715,468 | 2/1973 | Fujita | 178/5.4 CD |
| 3,723,638 | 3/1973 | Fujita | 178/5.4 CD |
| 3,749,826 | 7/1973 | Arimura | 178/5.4 CD |

*Primary Examiner*—Robert L. Richardson
*Attorney, Agent, or Firm*—Limbach, Limbach & Sutton

[57] ABSTRACT

An improved "color under" video recording and playback system which provides a phased color composite video signal having a wide band luminance component. In playback, the long term time base variations experienced by the lower frequency luminance information are introduced into the frequency shifted chroma and high frequency luminance information, which frequency shifted chroma and high frequency luminance information experiences less phase variations due to its lower recording frequency. The output signal has stable chroma for excellent color fidelity and stable high frequency luminance for excellent edge definition. Low frequency luminance information contains some uncorrected time base error which is not visible if the tape transport is within certain practical limits of stability relative to short term TBE's. A cancellation or interlace technique reduces synchronous distortion from the shifted color subcarrier.

9 Claims, 6 Drawing Figures

PHASED COLOR UNDER VIDEO RECORDING AND PLAYBACK METHOD AND APPARATUS

BACKGROUND OF THE INVENTION

The invention relates to video recording techniques and particularly to a method and apparatus for recording and reproducing a high quality color video signal using an improved color under technique.

A recurrent problem in moderate price video tape recorders (VTRs) has been the requirement to record and play back a full bandwidth color video spectrum, particularly a spectrum using the PAL (phase alternating line) system wherein the color (chroma) subcarrier is located at 4.43 MHz. The relatively high frequency of the subcarrier (compared to the 3.58 MHz NTSC subcarrier) not only places a strain on the high frequency response of the VTR, but typically forces a reduction in deviation (or instantaneous frequency swing) of the frequency modulation (FM) or pulse interval modulation (PIM) of the carrier on which the video information is placed in order to reduce moire distortion from folded sidebands generated in the record/playback process thus reducing signal to noise ratio. In in-band systems (in-band recording is that in which the entire composite color video signal modulates the FM or PIM carrier) one prior art solution is to increase the VTR writing speed and use higher carrier frequencies, thus increasing the VTR recordable bandwidth. However, this approach is unacceptable if it is desired to maintain format compatibility among a group of existing VTRs. A further problem in such prior art approaches is a high sensitivity to time base errors in the chroma band.

A further prior art solution has been the so-called "color under" technique wherein the color subcarrier and sidebands are shifted (heterodyned) to a frequency spectrum below the FM or PIM spectrum of the luminance information. The shifted chroma spectrum is recorded directly on the tape in an unused low frequency band and the higher frequency FM or PIM carrier acts as bias for the chroma information. Although the color under technique has proved to be suitable for domestic (home) or closed circuit applications, the systems have nonphased composite video signals and have been of too limited bandwidth and inadequate time base stability to be acceptable for critical applications such as broadcast.

Although the FM or PIM carrier can be viewed as bias to the color under information, it is more accurate to consider that the tape limiting process transforms the chroma information into some form of phase modulation. If the shifted chroma subcarrier is $f_{ssc}$ and the FM or PIM carrier is $f_c$, then the tape RF output includes the folded-in lower second sideband at $F_c-2f_{ssc}$ which is demodulated to baseband video at $2f_{ssc}$. The practical visible result is a synchronous interference pattern. Prior art color under systems have attempted to overcome this problem by reducing the shifted subcarrier level thus reducing $2f_{ssc}$, however, this causes a degradation of the color information signal-to-noise ratio.

SUMMARY OF THE INVENTION

The system herein presented allows for the first time broadcast applications in the frame of a color under technique. The invention described is used in correlation with a time base corrector in one embodiment and results in a full-bandwidth, fully stabilized signal meeting broadcast requirements.

The advantages of such an approach over earlier "in band" recording techniques are low sensitivity to time base errors. In PAL or NTSC recording, time base errors lead to noticeable line-to-line hue shifts. In the case of PAL receivers equipped with a glass delay line (PAL DL) these hue shifts are replaced by periodic color desaturation, more particularly visible in the reds, and known as "dark lining."

These effects are highly non-linear, and a 3 to 4 times reduction of the subcarrier phase variations over the present in-band recording scheme causes a nearly total elimination of the "dark lining."

The color under scheme accomplishes such a reduction in the following way:

In the in-band record process the duration of one 4.43 MHz subcarrier period is 225 ns. Therefore an uncorrected time base error of 20 ns, for example, will cause a $360 \times 20/225 = 32°$ error in the chroma phase.

In the present color under technique, the frequency of the subcarrier recorded on tape is 878.9KHz, for example. The same 20 ns time base error will thus lead to a $360 \times 20/1,150 = 6°$ error in the subcarrier phase. When the 878.9 KHz information is transposed to 4.43 MHz through heterodyne processing, any phase variation of the 878.9 KHz will result in an identical variation of the 4.43 subcarrier. It is a well known property of heterodyne systems to preserve angle relationships.

Therefore the same 20 ns time base error which causes a 32° 4.43 MHz error in the "inband" process, will only cause a 6° error in the color under process. The "dark lining" effect will then disappear, as if time base errors were reduced by 5 in an "in band" process.

In order to reduce the synchronous interference caused by the $2f_{ssc}$ component in the reproduced video, the present invention provides a technique for either cancelling the folded sideband or, alternatively, interlacing the folded sideband to reduce its visibility.

In order to reconstruct a high quality wideband signal at the VTR output it is essential to minimize the differential delay between the heterodyned color under chroma channel and the luminance channel. Although reference is made here and subsequently to "chroma spectrum" or the like it is to be understood that these terms include all the frequency above a selected frequency including the high frequency luminance information and that the term "luminance channel" or the like refers to all the frequency components below the selected frequency although these do not include all of the luminance information. Since the shifted chroma information is subject to fewer time base error effects (due to its lower frequency) than the luminance information, it is necessary to reintroduce the effects of the time base errors into the reproduced chroma color under signal. It has been found that this can be done by using the horizontal sync signals as a reference and causing the reproduced chroma information to follow the long term (greater than four horizontal lines) time base errors of the luminance signals. The resulting time base differential between the chroma and luminance channels is well within acceptable tolerances for typical moderately priced VTR transports. It will be understood, of course, that an inferior quality transport can introduce such great short term time base errors as to make the time base differential unacceptable.

The resulting phased color composite video signal has both a stable chroma spectrum necessary for color fidelity and a stable high frequency luminance spectrum necessary to avoid edge effects (at sharp amplitude changes in the picture). Moreover, other shortcomings of non-phased color systems are avoided including distortions of the color subcarrier dot pattern.

These and other advantages of the invention will be understood as the following description is read and understood.

DESCRIPTION OF THE PREFERRED EMBODIMENTS

Figure 1:
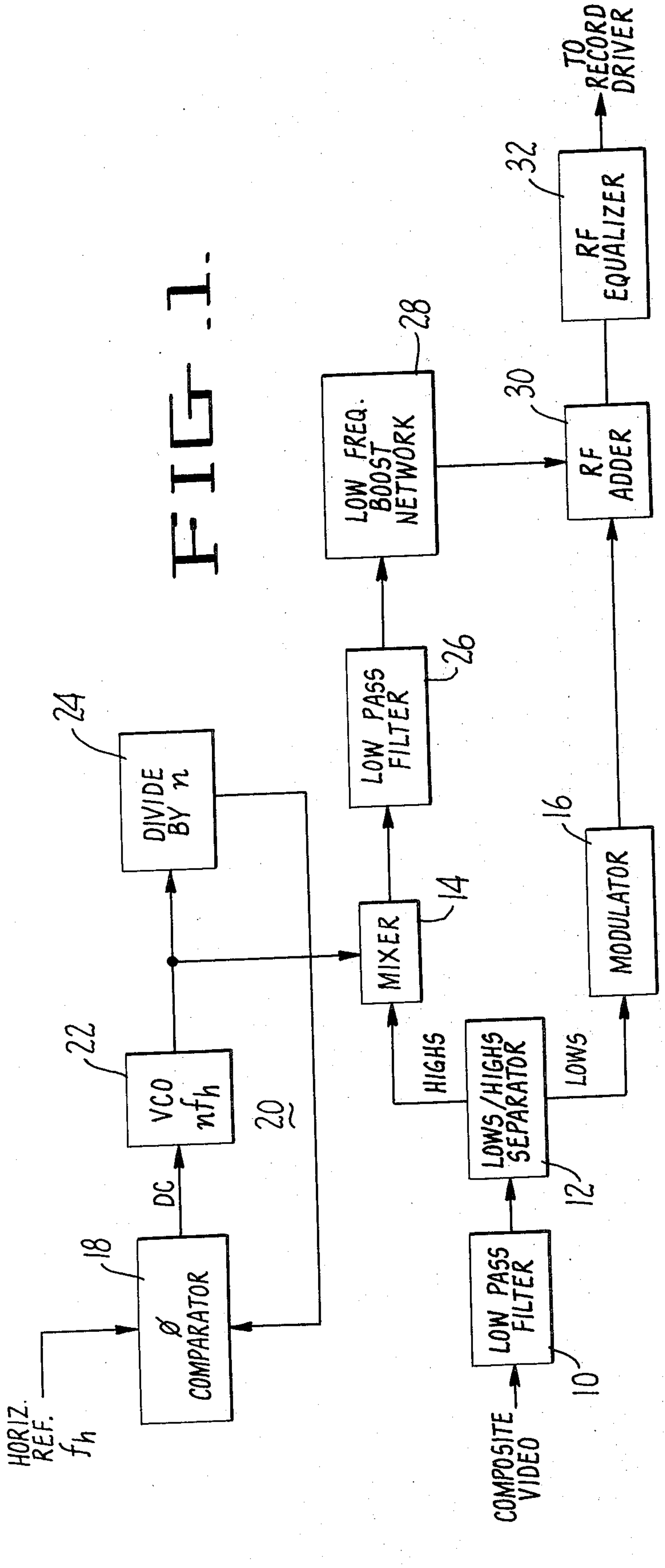
FIG. 1 is a block diagram of the record portion of a full bandwidth color under system according to the present invention.

FIG. 1 shows a block diagram of the record portion of a full bandwidth color under system according to the present invention. The composite video signal to be recorded is applied to a low pass filter 10 having a cutoff frequency above the highest baseband video frequency of interest. A suitable cutoff frequency is 5 MHz, for example, in a PAL color system. The filter 10 output is applied to a lows/highs separator 12 that divides the baseband video spectrum into two components above and below a break frequency which may be, for example, 3 MHz plus or minus 200 KHz. Separator 12 may take many forms such as complementary filters, however, its characteristics should maintain careful control of the phase and amplitude characteristics of the two output signals so that if the two output signals were immediately added back together the K factor preferably would be less than one percent. The higher frequency signals (above about 3 MHz in this example), which include the chroma (color) subcarrier and sidebands and high frequency luminance information, are applied to a mixer 14 that will be discussed further hereinafter. The lower frequency signals (below about 3MHz in this example), which include substantially all of the significant luminance information, are applied to a conventional modulator 16 which may be of the frequency modulation or pulse interval modulation type, for example.

The lower frequency signals applied to modulator 16 are processed as in conventional video recording. That is, the baseband video signals frequency or pulse interval modulate a carrier which typically has an instantaneous carrier frequency of at least on the order of 4 to 5 MHz, and in this example a swing of about 5.2 to 6.8 MHz. The exact carrier frequencies or details of the modulator 16 are not the essence of the present invention; they may be chosen in accordance with well known teachings in the video recording art to fit the particular recording requirements. It is sufficient to state that the carrier must be chosen to be high enough in frequency for a given instantaneous carrier swing (deviation in FM modulation) so that sufficient spectrum below the lowest significant sidebands remains for the shifted color under chroma spectrum to be described below.

A horizontal reference signal ($f_h$) frequency and phase locked to the composite video input from an outside source, such as in a television studio is applied to one input of a phase comparator 18 of a phase locked loop 20. The purpose of the loop is to provide a stable reference signal at $n$ times the horizontal reference frequency, thus the comparator 18 output, a DC control voltage, is applied to a voltage control oscillator (VCO) 22 at frequency $nf_h$. The VCO 22 output is applied to the other input of mixer 14 and to a divide by $n$ counter 24 that provides the loop frequency $f_h$ for comparison with the reference $f_h$ in comparator 18. In a PAL color system which has a horizontal frequency of 15,625 Hz, the VCO frequency may be chosen to be 5.3125 MHz, for example, in which case the divider divides by 340 (thus $n = 340$).

Figure 2:
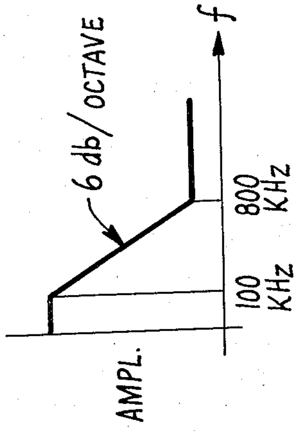
FIG. 2 is a plot of the amplitude/frequency characteristic of the low frequency boost network of FIG. 1.

The resulting output of interest from mixer 14 is the chroma subcarrier and sidebands (inverted) centered about the frequency $nf_h - f_{sc}$, where $f_{sc}$ is the chroma subcarrier frequency, and the high frequency luminance spectrum. In a PAL color system the chroma subcarrier is at 4.43 MHz, hence the mixer 14 output shifts the chroma subcarrier to (5.3125 − 4.4336 = 878.9 KHz). A low pass filter eliminates the mixer summation products ($nf_h + f_{sc}$) and may have, for example, a cutoff frequency of 3.2 MHz. The filtered shifted chroma information is applied to a low frequency boost network 28 in order to compensate for the low frequency response of the tape record/play process. FIG. 2 shows a plot of the network 28 characteristics.

An RF adder 30 receives the modulated carrier from modulator 16 which carries the basic luminance information and the sideband inverted frequency shifted chroma spectrum. The modulated carrier acts as a bias for the chroma spectrum which is to be directly recorded. The added spectrums are applied to a conventional RF equalizer 32 for application to a record driver (which drives the video record heads) (not shown).

Figure 3:
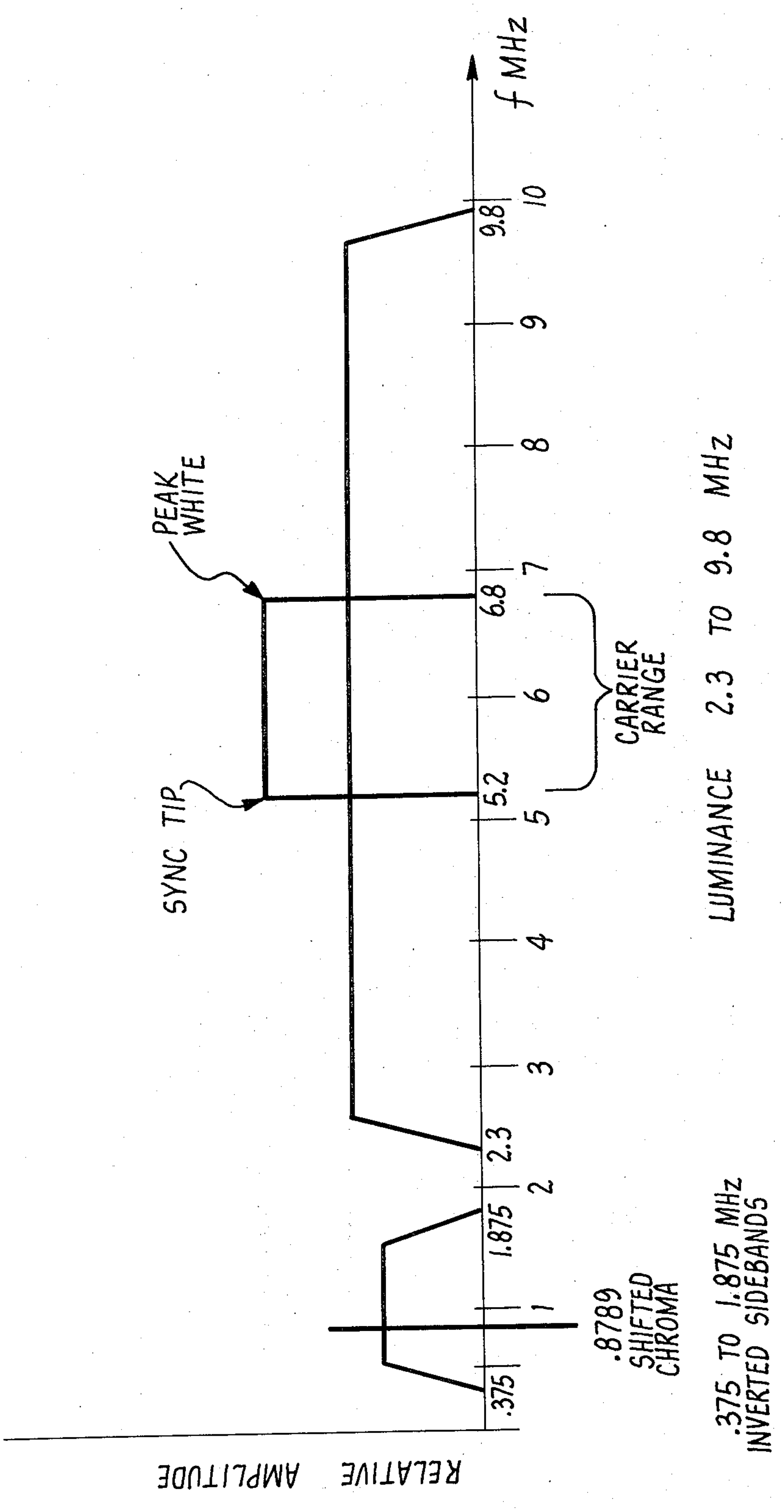
FIG. 3 is a schematic frequency plot of a representative spectrum produced by a color under system such as in FIGS. 1 and 2.

FIG. 3 shows a schematic frequency plot of a representative spectrum produced by a color under record system such as in FIGS. 1 and 2. The instantaneous carrier modulated by the luminance information varies from 5.2 (sync tip) to 6.8 MHz (peak white), generating significant sidebands from 2.3 to 9.8 MHz. The directly recorded chroma spectrum is centered at 878.9 KHz and has sidebands (inverted due to heterodyning) extending from 375 to 1,875KHz, below the lowest luminance sideband excursion.

Figure 4:
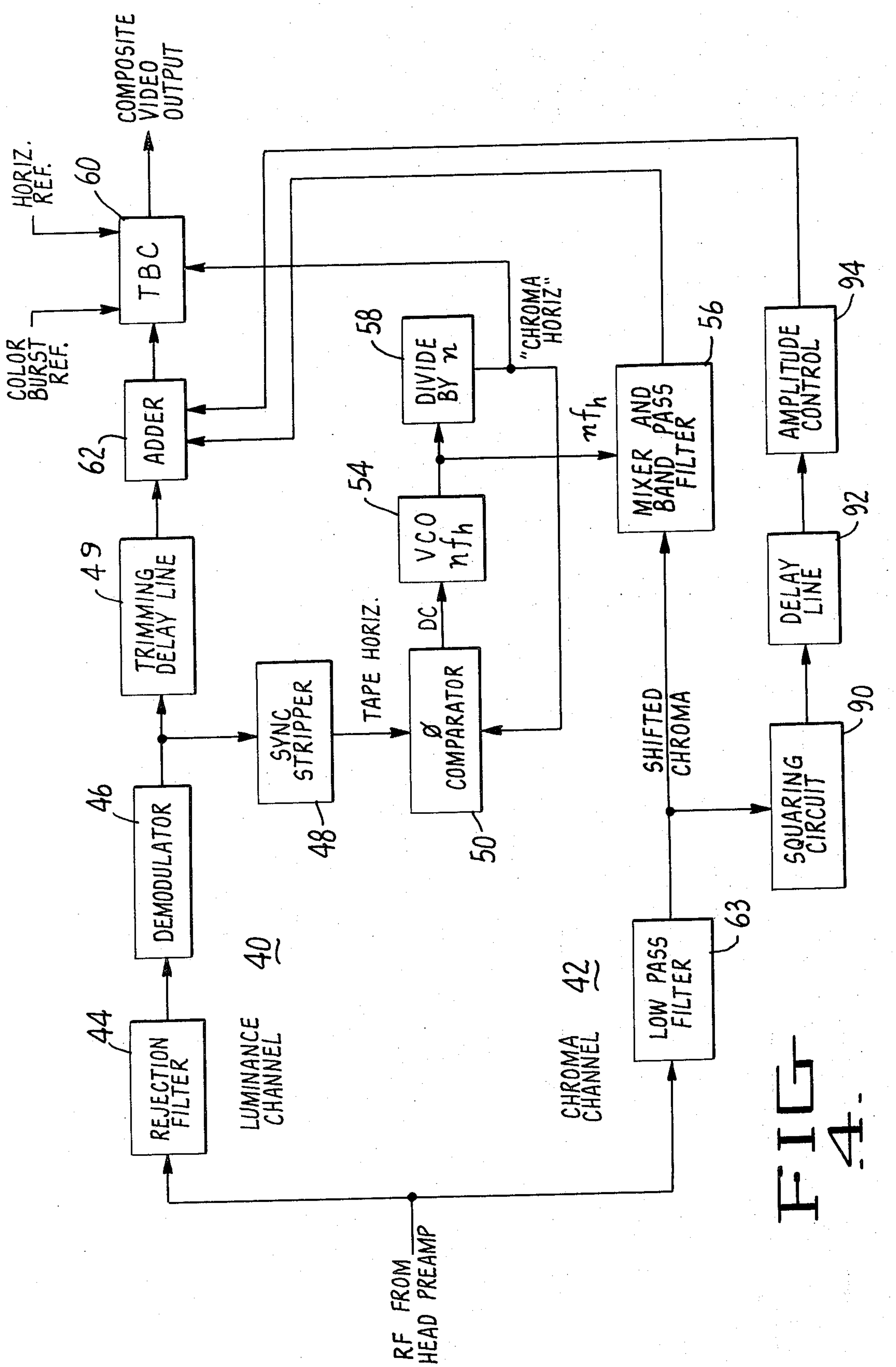
FIG. 4 is a block diagram of one preferred embodiment of a playback system according to the teachings of the present invention.
Figure 5:
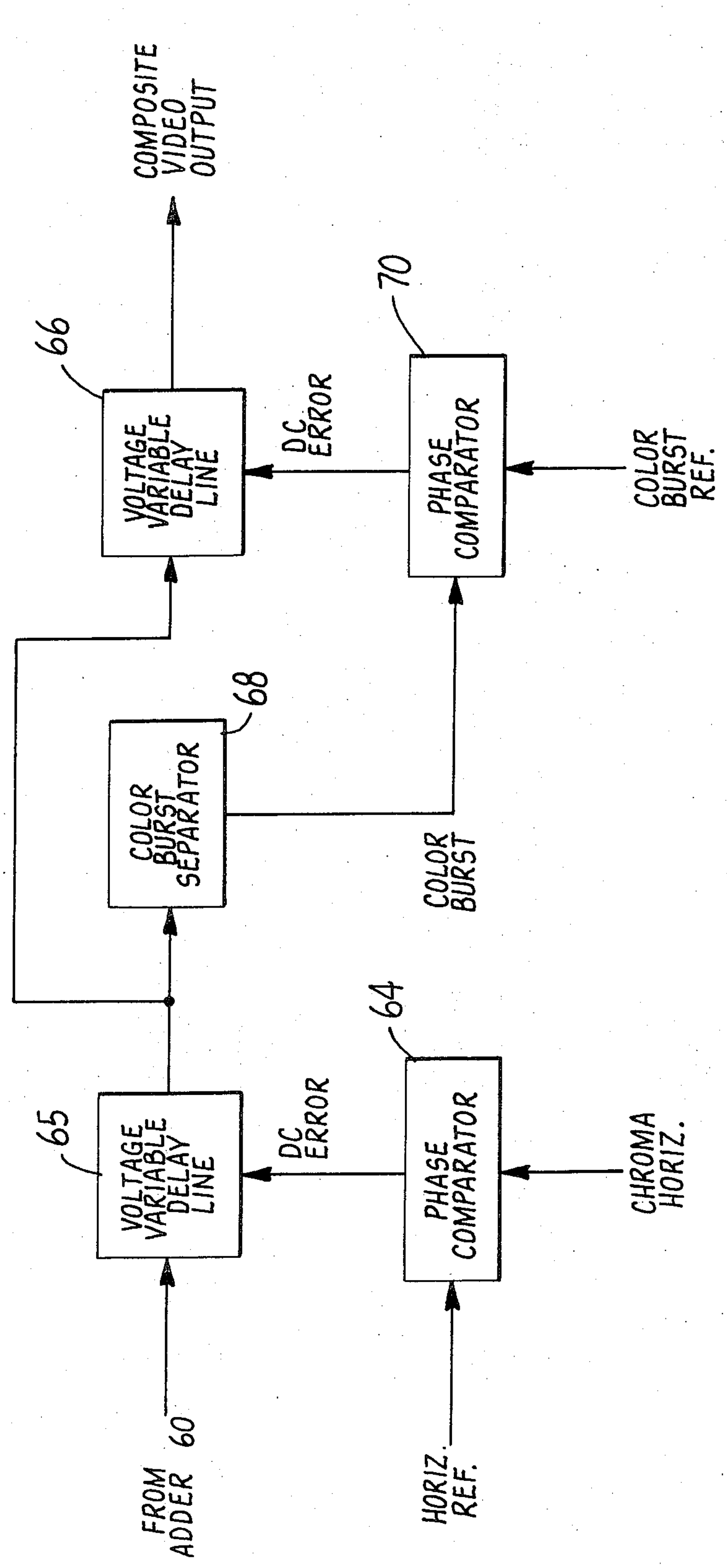
FIG. 5 is a block diagram of the time base corrector of FIG. 4.

FIGS. 4 and 5 show a block diagram of a first embodiment of a playback system for reproducing a composite video signal recorded in accordance with the teachings of the present invention as set forth in the embodiment of FIG. 1. The embodiment of FIGS. 4 and 5 are particularly useful in a broadcast studio application or other applications in which the video recorder is frequency and phase locked to external reference sync signals.

The off tape RF signals from the video head preamplifier (not shown) are applied to a chroma channel 42 and to a luminance channel 40. Referring first to the luminance channel 40, the signals are applied to a rejection filter 44 centered on the shifted chroma subcarrier frequency (878.9 KHz in the example) in order to remove the substantial portion of the chroma information before application to the demodulator 46. The demodulator 46 is conventional, including RF equalizer, limiter, etc., and its characteristics are chosen in accordance with the characteristics of the modulator 16 of FIG. 1. The demodulator 46 output is a baseband video signal comprising the luminance information and is applied to a sync stripper 48 and a trimming delay line 49 which is adjusted to minimize differential time delay between the chroma and luminance channel. The latter signal path is described below. The sync stripper 48 provides the off tape horizontal sync pulses to one input of a phase comparator 50 in a phase locked loop 52. Loop 52 is similar to loop 20 of FIG. 1. The bandwidth of loop 52 is approximately 800 Hz, the practical maximum, for example, therefore it is capable of following only long term time base errors in the reproduced luminance signal. The 800 Hz loop bandwidth in practice is nearly optimum inasmuch as a faster response would result in the same type of undesirable time base errors as in "in-band" systems. Conversely, a slower loop response would result in a poor time base differential between channels. By "long term" is meant those errors occurring no more rapidly than 800 Hz. The comparator DC error signal drives a VCO 54 operating at $n$ times the nominal horizontal frequency ($nf_h$), at 5.3125 MHz, for example. The VCO 54 output is applied to a mixer and bandpass filter 56, to be described further below, and to a divide by $n$ counter 58, which divides by the same number as counter 24 (340 in this example). The divider 58 output is applied to the other input of comparator 50 and provides what is herein referred to as the "chroma horizontal" signal to a color time base corrector 60. The "chroma horizontal" signal is at the off-tape luminance channel horizontal frequency to the extent that the tape horizontal frequency does not vary so rapidly due to time base errors as to exceed the loop bandwidth of phase locked loop 52.

The chroma channel 42 receives the RF signal at a low pass filter 63 that has a cut off frequency of 2.5 MHz, for example, depending on the carrier frequency and deviation of modulator 16 of FIG. 1. It is intended that the filter 63 output is substantially only the shifted chroma spectrum and that the modulated luminance information is filtered out. Thus the shifted chroma spectrum are applied to mixer and bandpass filter 56. The output of interest from the mixer 56 is the chroma spectrum centered at $nf_h$–$f_{ssc}$, where $f_{ssc}$ is the shifted chroma subcarrier frequency. For $nf_h$=5.3125 MHz and $f_{ssc}$ = 878.9 KHz, the resulting spectrum is centered at the original PAL color subcarrier frequency of 4.43 MHz. The bandpass filter in block 56 has end frequencies of about 2.5 and 5 MHz, for example, to pass the PAL color information.

By using the VCO 54 frequency output in mixer 56, the resulting chroma signal follows the long term time base errors of the luminance signal. That is, the chroma shifts slowly at a rate not faster than errors of four horizontal lines. Thus, the long term phase errors of the luminance channel, the higher frequency band as recorded, are introduced into the chroma signal so that the chroma signal exhibits the same long term (greater than 4 horizontal lines as determined by the loop 52 bandwidth) time base errors as if it had been recorded in a conventional manner on the modulated carrier.

The chroma spectrum (the restored 4.43 subcarrier and sidebands and the high frequency luminance spectrum having long term time base errors identical to the luminance channel) are added in adder 62 to the luminance channel, which has both long term and short term (faster than 800 Hz) time base errors. As will be understood, the resulting composite signal from the color TBC 60 output has a fully time base corrected chroma portion but a partially uncorrected time base luminance portion. However, the subjective impression by the human observer is such that the luminance short term time base errors are not seen provided that they do not exceed about 20 ns.

The recovered shifted chroma signals from filter 63 are also applied to a frequency squaring circuit 90 which essentially duplicates the limiting action of the tape to generate a signal of the same frequency but of opposite phase to the folded second order chroma sidebands. The unwanted $2f_{ssc}$ synchronous interference signal is readily cancelled due to its predictable amplitude and phase characteristics. A delay line 92 accounts for circuit delays before adder 62. Amplitude controller 94 is adjusted to provide the correct amplitude of the synchronous interference cancelling signal as it is applied to adder 62. Alternatively, the shifted chroma frequency may be changed so as to cause the synchronous interference producing folded sideband to interlace. The frequency is chosen for minimum synchronous interference visibility. The cancellation approach is preferred, however, because it is more reliable in dubbing copies from VTR to VTR.

The details of the color time base corrector 60 are shown in FIG. 5. The signal from adder 62 is applied to a conventional first voltage variable delay line (VVDL) 65 which variably delays the video signal in accordance with an applied DC signal from a phase comparator 64 which compares the external horizontal reference signals to the "chroma horizontal" to provide a coarse time base correction. Since this correction is based on the "chroma horizontal" which is limited by the loop 52 bandwidth, it does not take into account the rapid or short term phase errors occurring in the luminance channel. The VVDL 65 output is applied to a conventional second VVDL 66 and to a color burst separator 68 which gates out the color burst so that a second phase comparator 70 may compare the coarse corrected off tape color burst to the external reference color burst for fine time base correction. Again, the short term luminance phase errors are not corrected since the color burst is derived from the chroma channel which is derived using the loop 52. The result is a color phased composite video signal having a full bandwidth, fully stable chroma information, fully stable high frequency luminance information, but with short term luminance time base errors in the lower frequency luminance information which are of substantially no effect when the picture is viewed if these time base errors do not exceed about 20 ns.

Figure 6:
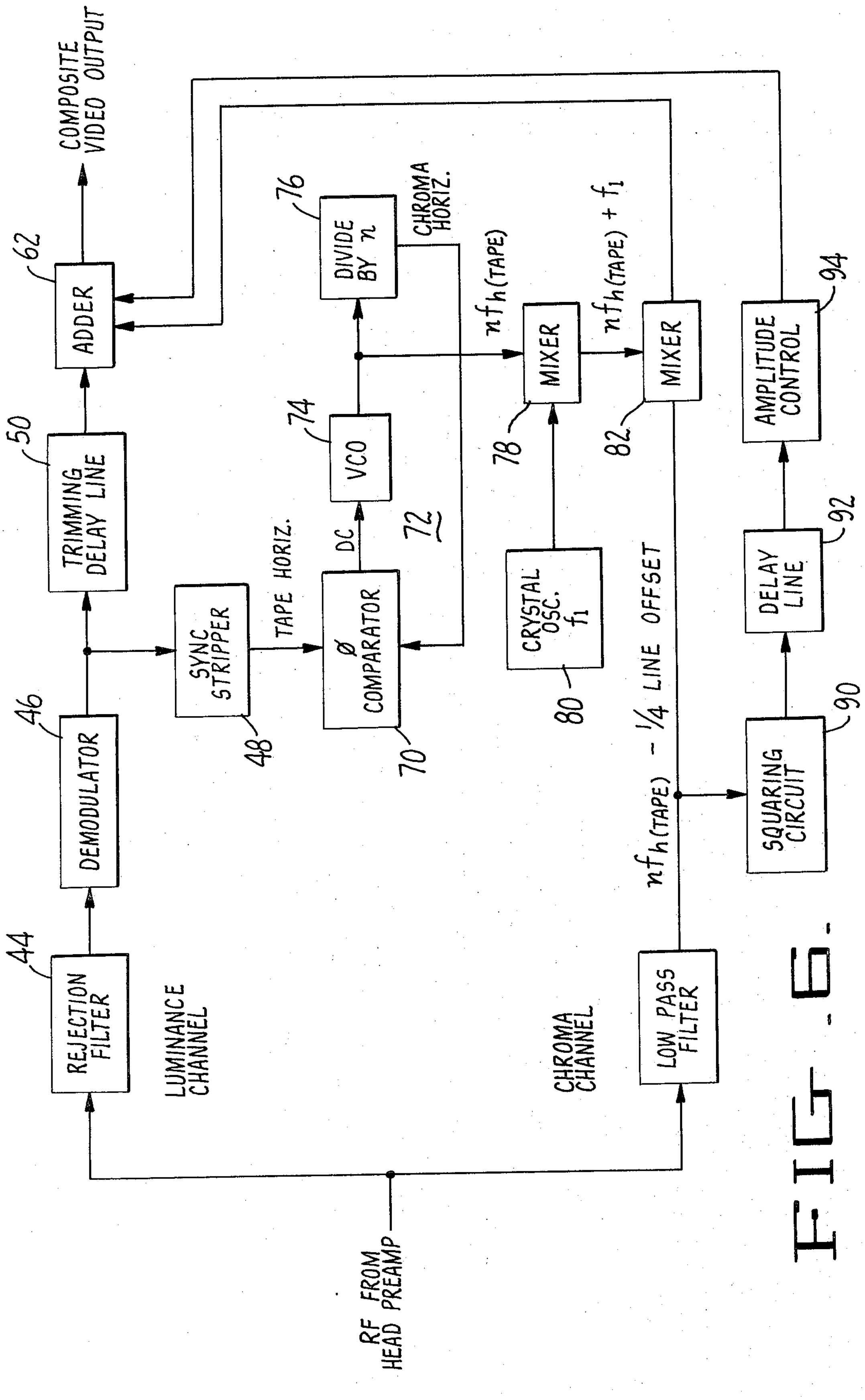
FIG. 6 is a block diagram of a further preferred embodiment of a playback system according to the teachings of the present invention.

FIG. 6 shows a block diagram of an alternate embodiment of a playback system for reproducing a composite video signal recorded in accordance with the teachings of the present invention as set forth in the embodiment of FIG. 1, but without the need for a time base corrector. Some of the same elements are used in FIG. 5 as in FIG. 3, and these elements are designated by the same reference numerals: rejection filter 44, demodulator 46, sync stripper 48, trimming delay line 50, adder 62, low pass filter 63, squaring circuit 90, delay line 92, and amplitude control 94. The same exemplary values and descriptions apply to these elements in FIG. 5.

The sync stripper 48 applies the off tape horizontal sync signals to a phase comparator 70 of a phase locked loop 72 which has the same bandwidth of loop 52. The comparator DC error voltage controls a VCO 74 operating at nominally $nf_{h(tape)}$ ($n$ times the tape horizontal frequency, or 878.9KHz, for example, the shifted chroma subcarrier frequency). The VCO output is divided by $n$ (by 56, for example) in block 76 and is applied to the other comparator 70 input.

The output from low pass filter 63 is $nf_{h(tape)}$ minus a quarter horizontal line offset due to the PAL color signal derivation. This signal and the VCO 74 output are at substantially the same frequency and have substantially the same time base errors: the two signals substantially track each other because they are of the same frequency. The VCO 74 output is also applied to a first mixer 78, where the signal $nf_{h(tape)}$ (878.9KHz, for example) is mixed with the $f_1$ signal from crystal oscillator 80. The frequency $f_1$ is chosen to provide a spectrum centered at the normal chroma subcarrier frequency at the output of a second mixer 82 when the mixer 78 output is mixed with the low pass filter 63 output. Due to the quarter line offset of the signal from filter 62, the oscillator 80 frequency $f_1$ is not exactly the normal subcarrier frequency, but is, for example, 4.4375 MHz. Thus the output from mixer 78 is $nf_{h(tape)}+f_1$, which is $n$ times the tape horizontal (with time base errors) plus a stable frequency. This is mixed with the signal from filter 63 which has the same time base errors; thus the output from mixer 82 is a stable chroma subcarrier with sidebands at the normal frequency (4.43 MHz for a PAL system). This stable chroma signal is then added in adder 62 to the luminance information to provide a non-phased color signal. As in the previous embodiment, the luminance signal has some time base errors; however, these are relatively unobservable by the human eye. The chroma portion of the resulting picture, however, is accurate and results in a highly satisfactory color picture.

The invention has been described with particular reference to the PAL color television system and reference has been made to certain exemplary frequencies for use in such a system. It is to be understood that the present invention is equally applicable to other color systems such as PAL-M, SECAM and NTSC and that the various filter, mixer, carrier frequencies, etc., may be changed to suit the particular application in accordance with the teachings herein. The invention, therefore, is to be limited only by the scope of the appended claims.

We claim:

1. A method of recovering a composite color video signal from a reproduced color under type video signal comprising filtering out the shifted chroma spectrum and demodulating the modulated carrier component of the color under type video signal in a first channel, filtering out the modulated carrier component of the color under type video signal to provide the shifted chroma spectrum in a second channel, generating a mixing signal containing time base errors of the reproduced color under type video signal, mixing said mixing signal and said shifted chroma spectrum to heterodyne said shifted chroma spectrum to its original frequency, and adding said demodulated carrier component and said heterodyned chroma spectrum to provide a composite color video signal, whereby the added demodulated carrier component and heterodyned chroma spectrum are substantially in phase.

2. The method of claim 1 wherein said mixing signal contains only the long term time base errors of the reproduced color under type video signal, whereby the added demodulated carrier component and heterodyned chroma spectrum are substantially in phase for long term time base errors.

3. Apparatus for recovering a composite color video signal from a reproduced color under type video signal comprising means in a first channel for filtering out the shifted chroma spectrum and for demodulating the modulated carrier component of the color under type video signal, means in a second channel for filtering out the modulated carrier component of the color under type video signal to provide the shifted chroma spectrum, means for generating a mixing signal containing time base errors of the reproduced color under type video signal, means for mixing said mixing signal and said shifted chroma spectrum to heterodyne said shifted chroma spectrum to its original frequency, and means for adding said demodulated carrier component and said heterodyned chroma spectrum to provide a composite color video signal, whereby the added demodulated carrier component and heterodyned chroma spectrum are substantially in phase.

4. The combination of claim 3 wherein said mixing signal contains only the long term time base errors of the reproduced color under type video signal, whereby the added demodulated carrier component and heterodyned chroma spectrum are substantially in phase for long term time base errors.

5. The combination of claim 4 further comprising means receiving said demodulated carrier component for generating a horizontal sync signal, time base corrector means adapted to receive horizontal sync and color burst reference signals and receiving said horizontal sync signal and composite color video signal for stabilizing time base errors in said composite color video signal.

6. The combination of claim 5 wherein said horizontal sync signal has only the long term time base errors of the color under type video signal, whereby said time base corrector means stabilizes only the long term time base errors in said composite color video signal.

7. The combination of claim 6 wherein said means for generating a mixing signal comprises phase locked loop means having a bandwidth capable of following only long term time base errors in the reproduced color under type video signal.

8. The combination of claim 7 wherein said means for generating a mixing signal further comprises sync stripper means receiving the demodulated carrier component of the color under type video signal for applying the horizontal sync signal of said color under type video signal to said phase locked loop means.

9. The combination of claim 8 wherein said phase locked loop means comprises phase comparator means for providing a DC error voltage in response to the phase difference between said horizontal sync signal and a feedback signal, voltage controlled oscillator means for providing an output signal at a frequency multiple of said horizontal sync signal having a frequency responsive to said DC error voltage, wherein said output signal is taken as said mixing signal, and frequency divider means receiving said output signal for dividing down said output signal frequency to the horizontal sync signal frequency and for applying said divided down output signal to said phase comparator means as said feedback signal, wherein said feedback signal is taken as said horizontal sync signal having only the long term time base errors of the color under type video signal.

* * * * *